United States Patent [19]

Lee, Jr.

[11] 4,311,633

[45] Jan. 19, 1982

[54] MODIFIED POLYPHENYLENE ETHER COMPOSITIONS

[75] Inventor: Gim F. Lee, Jr., Albany, N.Y.

[73] Assignee: General Electric Company, Pittsfield, Mass.

[21] Appl. No.: 174,935

[22] Filed: Aug. 4, 1980

[51] Int. Cl.$^3$ .................. C08L 51/04; C08L 71/04
[52] U.S. Cl. .................. 260/42.18; 525/68; 525/133
[58] Field of Search .................. 525/68, 132, 133; 260/42.18

[56] References Cited

U.S. PATENT DOCUMENTS

| | | | |
|---|---|---|---|
| 3,383,435 | 5/1968 | Cizek | 525/68 |
| 3,658,945 | 4/1972 | Nakashio et al. | 525/68 |
| 3,792,123 | 2/1974 | Abolins et al. | 525/68 |
| 3,833,688 | 9/1974 | Abolins | 525/68 |
| 3,943,191 | 3/1976 | Cooper et al. | 525/68 |
| 3,959,211 | 5/1976 | Cooper et al. | 525/68 |
| 3,960,808 | 6/1976 | Katchman | 525/68 |
| 3,974,235 | 8/1976 | Cooper et al. | 260/45.7 P |
| 3,981,841 | 9/1976 | Abolins et al. | 260/42.18 |
| 3,983,090 | 9/1976 | Abolins et al. | 260/42.18 |
| 4,101,503 | 7/1978 | Cooper et al. | 260/42.18 |
| 4,101,504 | 7/1978 | Cooper et al. | 260/42.18 |
| 4,101,505 | 7/1978 | Cooper et al. | 260/42.18 |
| 4,102,850 | 7/1978 | Cooper et al. | 260/33.6 AQ |
| 4,139,574 | 2/1979 | Cooper et al. | 260/45.7 P |
| 4,143,095 | 3/1979 | Lee | 260/42.18 |
| 4,152,316 | 5/1979 | Cooper et al. | 260/42.18 |
| 4,172,826 | 10/1979 | Haaf et al. | 260/42.18 |
| 4,198,492 | 4/1980 | Izawa et al. | 525/132 |

OTHER PUBLICATIONS

Chemical Abstracts 84:18347, vol. 84 (1976).

*Primary Examiner*—Wilbert J. Briggs, Sr.
*Attorney, Agent, or Firm*—Hedman, Casella, Gibson & Costigan

[57] ABSTRACT

There are provided compositions comprising a polyphenylene ether resin, an EPDM modified polystyrene and a copolymer of styrene and butyl acrylate, such compositions being characterized by good impact, thermal and flow properties.

8 Claims, No Drawings

MODIFIED POLYPHENYLENE ETHER COMPOSITIONS

This invention is concerned with compositions comprising polyphenylene ether resins which have been modified by inclusion of other polymers. More specifically, compositions comprising a polyphenylene ether resin, an EPDM modified polystyrene and a copolymer of styrene and butyl acrylate possess good flow during molding and good impact resistance and thermal stability after molding.

BACKGROUND OF THE INVENTION

The polyphenylene ether resins are well known in the art as comprising a family of thermoplastic materials which are suitable for various engineering purposes. These may be made by catalyzed and non-catalyzed processes which are described in the patent literature, such as in Hay, U.S. Pat. Nos. 3,306,874 and 3,306,875, and in Stamatoff, U.S. Pat. Nos. 3,257,357 and 3,257,358, which are incorporated herein by reference.

It is known that the polyphenylene ether resins may be admixed with styrene resins, both unmodified and modified, to produce compositions having properties which are better than those of either of the two polymers individually. Such compositions are disclosed by Cizek in U.S. Pat. No. 3,383,435, incorporated herein by reference.

It is known that compositions containing a polyphenylene ether resin can be improved by including polystyrene which has been modified by EPDM elastomers. Such compositions are disclosed by Abolins and Cooper, in U.S. Pat. Nos. 3,943,191, 3,959,211 and 3,974,235 (EPDM rubber having a low degree of unsaturation); by Abolins, Cooper and Lee, Jr., in U.S. Pat. No. 3,981,841 (includes emulsion-graft EPDM-styrene copolymer); by Cooper and Haaf, in U.S. Pat. No. 4,172,826 (small particle size EPDM together with hydrogenated triblock); by Cooper and Katchman, in U.S. Pat. No. 4,101,503 (small particle size EPDM rubber in which the styrene resin has a high molecular weight), in U.S. Pat. No. 4,101,504 (in which the EPDM rubber content is at least 8 percent by weight); in U.S. Pat. No. 4,101,505 (containing at least about 2 percent by weight of a toluene-insoluble gel); in U.S. Pat. No. 4,102,850 (small particle size EPDM rubber together with mineral oil); in U.S. Pat. No. 4,139,574 (EPDM rubber in combination with hydrogenated radial teleblock copolymer); and in U.S. Pat. No. 4,152,316 (the EPDM rubber has a particle size of less than about two microns); by Katchman, in U.S. Pat. No. 3,960,808 (EPDM modified styrene resin in combination with unmodified styrene resin); and by Lee, Jr., in U.S. Pat. No. 4,143,095 (EPDM rubber modified styrene resin in combination with hydrogenated triblock).

It has been disclosed by Abolins and Reinhard, in U.S. Pat. Nos. 3,792,123, 3,833,688 and 3,983,090, that compositions containing a polyphenylene ether resin can be modified for improvements in the toughness and resistance to aggressive solvents by including certain acrylic resin modified diene rubber-containing resins.

It has more recently been proposed that compositions comprising a polyphenylene ether resin and a homopolystyrene can be modified by including a copolymer of styrene and butyl acrylate. Although significant improvement in the flow properties was observed, it was also found that the improvement in the impact resistance was disappointingly small.

It has now been discovered that if a copolymer of styrene and butyl acrylate is included in a composition comprising a polyphenylene ether resin and an EPDM modified polystyrene, the resulting composition possesses enhanced impact resistance, good flow properties and satisfactory thermal stability.

DESCRIPTION OF THE INVENTION

According to this invention, there are provided thermoplastic compositions useful for molding, e.g., extrusion, compression molding, injection molding, and the like, which comprise:

(a) a polyphenylene ether resin;

(b) a polystyrene which has been modified with a rubbery interpolymer of a mixture of mono-olefins and a polyene; and (c) a copolymer of styrene and butyl acrylate.

The rubbery interpolymer of a mixture of mono-olefins and a polyene is sometimes also referred to as an "EPDM-rubber". In this invention, both saturated and unsaturated forms may be used, although those types in which substantially all of the rubber has been saturated (for greater thermal stability) are favored.

The preferred polyphenylene ether resins are those having the formula

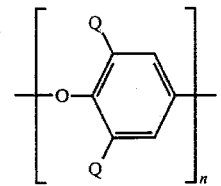

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

The preparation of polyphenylene ether resins corresponding to the above formula is described in the above-mentioned patents of Hay and Stamatoff, The most preferred polyphenylene ether resin for use in this invention is poly(2,6-dimethyl-1,4-phenylene)ether.

The styrene resin should have at least 25 percent of its units derived from an alkenyl aromatic monomer of the formula

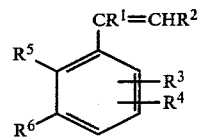

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms and $R^5$ and $R^6$ are selected from the group consisting of hydrogen and lower alkyl and alkenyl groups of from 1 to 6 carbon atoms, or $R^5$ and $R^6$ may be concatenated together with hydrocarbyl groups to form a naphthyl group.

Specific examples of alkenyl aromatic monomers include styrene, bromostyrene, chlorostyrene, α-methylstyrene, vinylxylene, divinylbenzene, vinyl naphthalene, and vinyl-toluene. Especially preferred for use herein is styrene.

The useful EPDM polymers include those polymers which have been prepared from ethylene, an alpha-olefin and a polyene. Preferred types comprise from 10–90 mole percent of ethylene, 10–90 mole percent of an alpha-olefin containing 3–16 carbon atoms, and 0.1–12 mole percent of a polyene which is a nonconjugated cyclic or open-chain diene having 5–20 carbon atoms. Especially preferred are those alpha-olefins having 3–10 carbon atoms and non-conjugated cyclic or open-chain dienes having 5–10 carbon atoms.

Useful EPDM rubbery polymers also include the ethylenepropylene-ethylidene norbornene terpolymers and those described in Ritchie, Vinyl and Allied Polymers, Vol. 1, page 121 (1968), which is incorporated herein by reference. Preferred EPDM rubbery interpolymers are those comprised of ethylene, propylene and 5-ethylidene-2-norbornene; of ethylene, propylene and 1,4-hexadiene; and of ethylene, propylene and dicyclopentadiene. Preferred modified alkenyl aromatic resins include from about 4 to about 25 percent by weight of the rubbery interpolymer.

The polystyrene modified with an EPDM rubber can be prepared by dissolving the rubbery interpolymer in the styrene monomer and polymerizing the mixture, preferably in the presence of a free radical initiator, until 90–100% by weight of the styrene monomer has reacted to form said EPDM-modified polystyrene.

The preferred copolymers of styrene and butyl acrylate are graft interpolymers of poly(butyl acrylate) and polystyrene. These are prepared conventionally, e.g., such as by polymerizing styrene in the presence of butyl acrylate rubber and terminating the polymerization reaction after a copolymer containing approximately equivalent amounts of poly(butyl acrylate) and polystyrene has been obtained. See, e.g., Ito et al, Chem. Abs. 84:18347 (1976), for butyl acrylate-styrene graft copolymers.

The polymeric components of the compositions of this invention may be present in virtually all proportions. As is well known, polyphenylene ether resins and polystyrene are compatible in virtually all proportions, e.g., from 1 to 99 parts by weight of the polyphenylene ether resin to 99 to 1 parts by weight of the polystyrene. Similarly, the amount of the copolymer of styrene and butyl acrylate can vary widely in the compositions. Preferably, however, the compositions of this invention contain from about 5 to about 95 parts by weight of the polyphenylene ether resin, from about 95 to 5 parts by weight of the EPDM modified polystyrene and from about 5 to about 50 parts by weight of the copolymer of styrene and butyl acrylate.

Other ingredients, such as pigments, coloring agents, flame retardant agents, drip retardants, antioxidants, stabilizers, plasticizers, reinforcing agents and/or fillers, and the like, can also be included in the compositions of this invention, for their conventionally employed purposes.

Special mention is made of reinforcing agents and/or fillers comprised of fibrous glass. This material, if employed, is preferably present in amounts in the range between about 5 to about 50 parts by weight, based on (a), (b) and (c) combined.

Where flame retardancy is desired, a flame retardant agent or agents can be included in the compositions. In general, the flame retardant agent is selected from among conventional materials, including halogenated organic compounds, halogenated organic compounds in admixture with an antimony compound, elemental phosphorus, phosphorus compounds, compounds containing phosphorus-nitrogen bonds, and mixtures of any of the foregoing. Preferably, the flame retardant agent is present in an amount between from about 0.5 to 50 parts by weight, per 100 parts of (a), (b) and (c) combined.

The compositions may be prepared in any manner. Usually, however, the compositions are prepared by tumbling the ingredients to form a pre-blend, extruding the pre-blend at a temperature of from about 450° to about 650° F., cutting the extrudate into smaller pieces and injection molding at a temperature of from about 450° to about 550° F.

The compositions can be molded into articles of any desired shape and size.

DESCRIPTION OF THE PREFERRED EMBODIMENTS

This invention is further illustrated in the following examples which are not to be construed as limiting.

EXAMPLES 1–4

Compositions according to this invention are prepared by blending the ingredients, extruding the blend at a temperature of 550° F., in a Werner-Pfleiderer 28-mm twin screw extruder and injection molding at a temperature of 500° F., mold temperature of 190° F.

The molded compositions are evaluated for physical properties according to standard ASTM procedures. The compositions and properties are reported in the Table.

TABLE

Compositions Comprising a Polyphenylene Ether Resin, an EPDM Modified Polystyrene and a Copolymer of Butyl Acrylate and Styrene

| | 1 | 2 | 3 | 4 | A* | B* |
|---|---|---|---|---|---|---|
| Ingredients, parts by weight | | | | | | |
| Poly(2,6-dimethyl-1,4-phenylene)ether[a] | 70 | 70 | 50 | 50 | 70 | 50 |
| EPDM modified polystyrene[b] | 30 | 30 | 50 | 50 | 30 | 50 |
| Copolymer of styrene and butyl acrylate (I)[c] | 10 | — | 10 | — | — | — |
| Copolymer of styrene and butyl acrylate (II)[d] | — | 10 | — | 10 | — | — |
| Physical Properties | | | | | | |
| Tensile yield, psi × 10$^{-3}$ | 10.5 | 10.4 | 8.9 | 9.0 | 11.0 | 10.3 |
| Tensile strength, psi × 10$^{-3}$ | 8.4 | 8.6 | 8.5 | 8.2 | 9.5 | 9.4 |
| Tensile elongation, % | 33 | 43 | 94 | 82 | 56 | 83 |
| Notched Izod impact strength, ft. lbs./in. | 5.3 | 5.3 | 6.0 | 6.9 | 2.6 | 3.6 |
| Gardner impact strength, | | | | | | |

TABLE-continued

Compositions Comprising a Polyphenylene
Ether Resin, an EPDM Modified Polystyrene
and a Copolymer of Butyl Acrylate and Styrene

| | 1 | 2 | 3 | 4 | A* | B* |
|---|---|---|---|---|---|---|
| in.-lbs. | 200 | 250 | 180 | 210 | 50 | 210 |

*comparison experiment

[a] having an intrinsic viscosity of 0.46 deciliters per gram in solution in chloroform at 30° C.

[b] Foster Grant's FG 2216, an EPDM rubber modified polystyrene in which substantially all of the rubber is saturated

[c] Marbon's 25523-O

[d] Marbon's 25523-P

Other modifications and variations of the present invention are possible in view of the foregoing description. It is to be understood, therefore, that changes may be made in the particular embodiments of the invention without departing from the principles or scope of the invention defined in the appended claims and without sacrifice to the chief benefits.

I claim:

1. A thermoplastic composition, which comprises:
   (a) a polyphenylene ether resin;
   (b) a polystyrene which has been modified with a rubbery interpolymer of a mixture of mono-olefins and a polyene; and
   (c) a copolymer of styrene and butyl acrylate.

2. A composition as defined in claim 1, comprising from about 5 to about 95 parts by weight of the polyphenylene ether resin, from about 95 to about 5 parts by weight of the polystyrene which has been modified with a rubbery interpolymer of a mixture of mono-olefins and a polyene, and from about 5 to about 50 parts by weight of styrene and butyl acrylate.

3. A composition as defined in claim 1, in which the copolymer of styrene and butyl acrylate consists of a graft interpolymer comprising approximately equivalent amounts of polystyrene and poly(butyl acrylate).

4. A composition as defined in claim 1, in which the polyphenylene ether resin has the formula

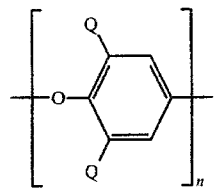

wherein the oxygen ether atom of one unit is connected to the benzene nucleus of the next adjoining unit, n is a positive integer and is at last 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

5. A composition as defined in claim 2, in which the polyphenylene ether is poly(2,6-dimethyl-1,4-phenylene)ether.

6. A composition as defined in claim 1, in which the alkenyl aromatic resin has at least 25% of its units derived from the formula

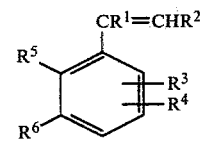

wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms and $R^5$ and $R^6$ are selected from the group consisting of hydrogen and lower alkyl and alkenyl groups of from 1 to 6 carbon atoms, or $R^5$ and $R^6$ may be concatenated together with hydrocarbyl groups to form a naphthyl group.

7. A composition as defined in claim 1, which also includes a reinforcement and/or filler consisting of fibrous glass.

8. A composition as defined in claim 1, which also includes a flame retardant agent.

* * * * *